Aug. 7, 1956

J. F. DE LISI ET AL 2,757,728

CUTTING BY MOVING ROLLER HORIZONTALLY OVER
DIE WHICH IS FREE FOR VERTICAL MOVEMENT

Filed Sept. 23, 1954

INVENTORS
JOHN F. DeLISI
CY ROMM

BY

Philip S. McLean
ATTORNEY

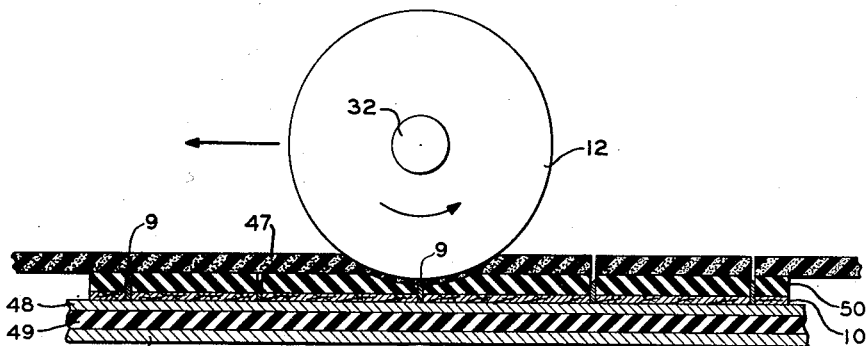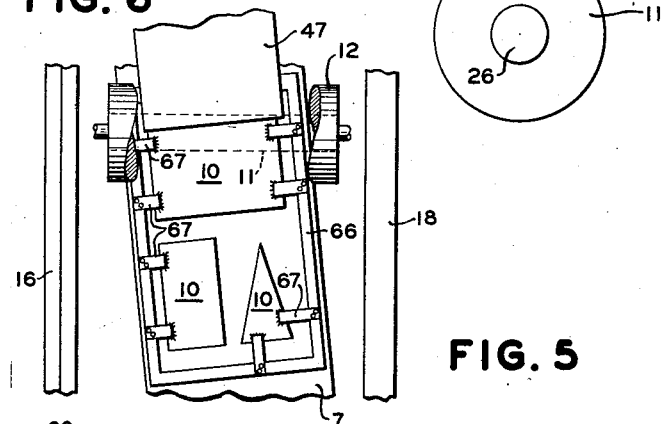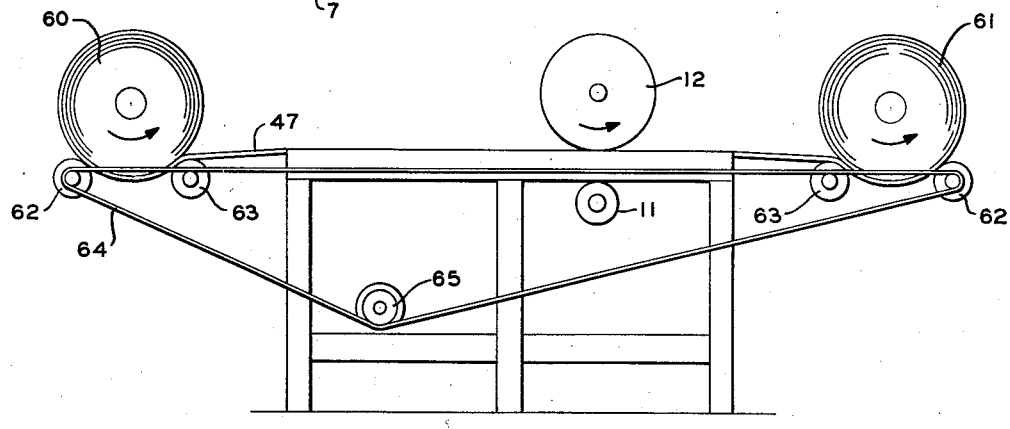

United States Patent Office 2,757,728
Patented Aug. 7, 1956

2,757,728

CUTTING BY MOVING ROLLER HORIZONTALLY OVER DIE WHICH IS FREE FOR VERTICAL MOVEMENT

John F. De Lisi, Forest Hills, and Cy Romm, Brooklyn, N. Y.; said De Lisi assignor to said Romm Application September 23, 1954, Serial No. 457,962

9 Claims. (Cl. 164—17)

The invention disclosed in this patent application is a machine for cutting and scoring various materials such as paper, cardboard, rubber, foam rubber, linoleum and the like.

Important uses of the machine are for cutting and scoring folding box blanks, advertising displays, calendars, folders and other articles requiring a high degree of accuracy.

Particularly, the machine has been designed for the cutting of foam rubber and other soft and resilient materials and the cutting of large displays where the sheeting is too large or too thick or otherwise not readily bent or sufficiently flexible to be fed around the cylinders of conventional roller press cutters.

In conventional machines now in use, considerable time is required for "make ready." It is a purpose of the present invention to avoid and eliminate this need and to provide a machine which will be ready for instant use merely by placing the cutting die in position in the machine.

Special objects of the invention are to provide a more or less self-compensating form of mounting for the cutting dies which will automatically equalize minor irregularities and assure the dies cutting and scoring sharp and clean, as intended in their design.

Further special objects of the invention are to operate with a rotary or rolling line cut which will assure uniform and constantly effective action of the cutting and scoring edges of the dies.

Other special objects of the invention are to provide a machine of the character indicated which can be readily controlled and adjusted and the operation be fully observed.

Other important objects of the invention are to provide a machine as indicated which will be rapid and effective in operation and to which the material to be cut can be readily fed or supplied and the finished product be as readily discharged or removed either by hand or automatically and which with all these advantages will be entirely safe in operation and control.

In addition to the above objects it is a purpose of the invention to provide such machine in a relatively simple, inexpensive form which will not take up much floor space and will be generally suitable to the needs and requirements of the trade.

Further, it is a purpose of the invention to provide a production machine suitable as an adjunct to the conventional cylinder press where short runs or samples are often required. By reason of elimination of the "make ready" time, the present invention provides a practical die cutting machine which may be used with a cylinder press for running off samples or small quantities of work.

Other desirable objects attained by the invention and the novel features of construction, combinations and relations of parts embodying the invention are set forth in the following specification and broadly covered in the accompanying claims.

The drawings included in and forming part of the specification illustrate a present commercial embodiment of the invention. Structure, however, may be modified and changed as regards the immediate illustration, all within the true intent and scope of the invention as hereinafter defined and claimed.

Fig. 1 in the drawings is a broken longitudinal sectional view of the machine;

Fig. 2 is an end view looking at the left-hand end of the machine shown in Fig. 1, with parts appearing in section;

Fig. 3 is a broken detail view of the movable switch block for controlling the machine;

Fig. 4 is an enlarged and exaggerated sectional view illustrating operation of the travelling cutting rollers;

Fig. 5 is a diagrammatic view illustrating modification of the machine to accomplish die cutting of a continuous length of material.

Fig. 6 is a broken diagrammatic plan view illustrating relation of parts of the machine.

Figure 1:
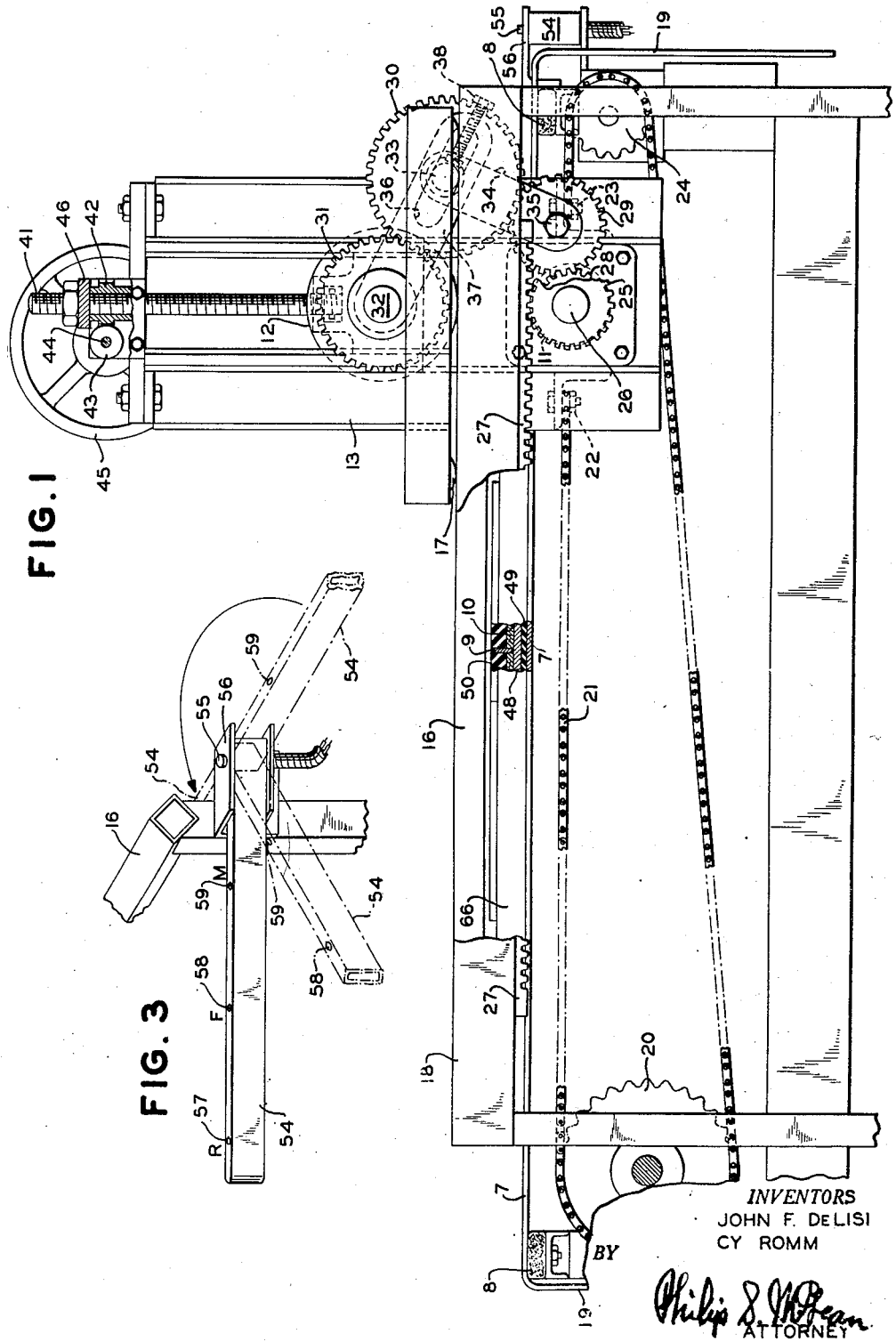

In Fig. 1 the principal features of the invention are shown as comprising a flexible table 7 of sheet material sustained by end supports 8 and carrying the cutting dies, shown as edge strips 9 in laminated boards 10 with a supporting roller 11 below the table and a pressure applying roller 12 above, the two rollers journaled in a carriage 13 mounted to traverse the table.

This carriage is shown in Fig. 2 as having angularly related rollers 14, 15 at one end riding on the inclined sides of a rectangular track 16 and rollers 17 at the opposite end riding on a flat track 18.

The ends of the flexible table 7 are shown in Fig. 1 as turned down over the end supports 8 in the form of aprons 19.

Motion is imparted to the carriage in the illustration by a motor driven sprocket 20 having an overrunning chain 21 connected at its opposite ends at 22, 23 with opposite sides of the carriage, said chain running over an idler sprocket 24.

Rotation is imparted to the supporting and pressure applying rolls in the illustration by means of a spur gear 25 on the end of the lower roll shaft 26 in engagement with a stationary rack 27, said shaft carrying a pinion 28 in mesh with gear 29, the latter engaging gear 30 in mesh with gear 31 on the upper roll shaft 32.

To enable relative adjustment of the upper and lower rolls in respect to each other, the intermediate gear 30 is shown as carried by shaft 33 journaled in link 34 pivoted on the axis 35 of the first intermediate gear 29.

The shaft 33 is shown adjustable in slot 36 in a link 37 pivoted on shaft 32 of the upper roll, and a take-up screw is indicated at 38 for adjusting shaft 33 in the slot 36.

The shaft 32 of the upper roll is shown as mounted in journal bearings 39 vertically adjustable in the guides 40 by means of screw shafts 41 carrying worm or spiral gears 42 engaged by coacting gears 43 on a cross shaft 44, the latter having a hand wheel or similar adjusting member 45.

The gears 42 are in screw engagement on the vertical shafts 41 and confined against vertical movement in boxes 46 so as to operate as rotatable nuts for raising and lowering the upper roll.

In such vertical adjustments of the upper roll the gears 28, 29, 30 and 31 constituting the driving train, remain in mesh by reason of the constant center articulation provided by the pivoted gear carrying links 34, 37. The surface speed of the top roll may be changed to suit the material being operated on or other conditions by substituting gears 31 of different diameter and the screw 38 enables adjustments to be made to hold the intermediate gears in proper mesh with the upper roll gear 31.

Fig. 4 shows in somewhat exaggerated form how with travel of the carriage toward the left and rotation of the lower supporting roll clockwise and the upper pressure roll anti-clockwise, the flexible table will be supported by the lower roll on a line directly beneath the upper roll, with the die in between and effecting a line cut of the material represented at 47.

To compensate for any slight inaccuracies and to assure proper cutting or scoring pressure, the board 10 carrying the die strips is shown as supported on a flexible metal plate 48 cushioned by a pad or layer of rubber 49. This metal faced resilient pad affords desirable cushioning and at the same time provides a metal backing for the bottom edges of the die strips. The die is shown as faced with a layer of rubber 50 forming a stripper.

An important feature of the construction disclosed is that it enables cutting and scoring of relatively thick as well as thinner layers or plies of material.

Fig. 4 illustrates this point, showing how a layer of thick material such as foam rubber will be compressed by the travelling rolls on the cutting line substantially at right angles to the plane of the material so as to accomplish a straight cut without slant or curvature to one side or the other.

The sprocket 20 driving the chain 21 which reciprocates the carriage may be part of a gear reduction unit 51 which may be driven by belt and pulley connections 52 or otherwise from an electric motor 53, Fig. 2.

Control of the motor is effected in the illustration by a double combination switch unit 54, Figs. 1 and 3, pivoted at 55 to swing in a supporting bracket 56 at one end of the machine and having three switch buttons 57, 58, 59. One of these, such as 59, is for a master switch and the other two, 57 and 58, are for reverse and forward motions of the carriage. This combination requires that the master switch be held closed by one hand and either the forward or reverse switches be held closed by the other hand, the spacing of the switch buttons being such as to require use of both hands in either instance. This is a highly desirable safety feature. For forward motion of the carriage, the master switch 59 must be held closed by one hand and the forward motion switch 58 be held closed by the other hand. For reverse motion the master switch 59 must be held closed and reverse switch 57 be depressed. Consequently, operation of the machine requires use of fingers of both hands and the machine will stop instantly if either of the two switches used is released.

As a further safety provision the switch bar 54, by reason of its pivotal mounting may be swung into different positions as in Fig. 3, where operations of the machine may be best observed and the machine be instantly stopped or started as required.

Generally the machine may be operated by just placing the dies on the supporting table 7. In some instances it may be desirable to fasten the dies down on the table with edge clamps or other suitable securing devices. Thus, in Figs. 1 and 2 the die is shown enclosed within an open frame 66 resting or secured on the table and held down by inwardly projecting clamping strips 67.

The dies may be placed on the table in any desired relation but usually it may be desirable to locate a rectangular die diagonally with corners pointed longitudinally of the table so that pressure of the rolls will be applied starting at a corner point, increasing the length of contact gradually instead of abruptly across the full width of the die.

The machine may be operated to cut in travel of the carriage both ways, or only in one direction, as found best suited to immediate conditions and materials handled. The dies may occupy only a portion or the full expanse of the table, thus enabling dies of any shape and size to be accommodated.

The material to be cut may be in separate pieces laid on the die by hand or otherwise. Also, the material instead of being in separate pieces, may be a continuous length fed into position over the dies.

The feed of material may be automatic and Fig. 5 is an illustration showing how the material indicated at 47 may be unwound from a supply roll 60 at one end of the machine and extended over the table to a take-up roll 61 at the other end of the machine, these two rolls being cradled between trunnion rolls 62, 63 driven by belt or chain 64 from motor 65.

Fig. 6 shows diagrammatically how the table may be angled longitudinally of the machine and the material be fed in on the same angle. Then with the die or dies 10 and the material disposed parallel with the edges of the table the desired angle of cut will be effected, and this will be accomplished with the least amount of waste along the side edges of the die. Also, in this relation, with the material being rewound on lines parallel with the edges of the table, the material will unwind and rewind smoothly without twisting or pulling out of shape, a particularly important feature in the cutting of stretchy, resilient material such as foam rubber.

To overcome the wave effect and resultant distortion of the cut edges on resilient material such as foam rubber, the upper roll, as here indicated, may be driven at faster surface speed than actual travel of the carriage so as to draw the material into the bite between the crowns of the rolls as the material is compressed and acted on by the cutting dies. This will be appreciated by reference to Fig. 4, which shows how the actual cutting is effected between the crowns of the rolls and how the faster surface speed of the upper roll will draw the material into the cutting die fast enough to overcome stretching and distortion and to effect a straight cut.

The invention makes it possible and practical to cut either small or large pieces or a variety of either or both and since "make ready" is eliminated, all this can be effected at low operating cost.

The invention also makes it possible to die cut large size cardboard that cannot be run on an ordinary cylinder die press. The material actually can be practically as large as the table and in any desired lengths.

The material, as herein shown, can be either in separate pieces or all in one continuous length. Feeding it on the incline, as indicated in Fig. 6, avoids unnecessary waste and accomplishes the cutting at the most effective angle.

While steel rule dies have been illustrated it will be realized that the machine may be operated with rigid "clicker" or ordinary or special press dies.

While for general purposes the upper, pressure roller may be of hardened steel, particularly when the machine is used for cutting relatively soft and flexible or resilient materials such as rubber and the like, where the knife edges are not required to be kept so sharp, it is contemplated that the upper roll may have a compressed paper or other hard but somewhat yieldable surface which will not dull the knife edges, this particularly when the machine is used for cutting cardboard and the like where sharp knife edges are desired.

Another way of providing a yielding or nondulling surface on the upper roll is to face that roll with a layer of flexible sheet material such as fiberboard or to run a loop of such material about the pressure roll and a companion guide roll, thus to present fresh pressure surfaces to the die cutting edges.

The new method herein disclosed of die cutting between travelling pressure rolls effects a line cutting of the material between the crowns of the rolls which can be accomplished with a minimum of power and which does not require a machine of expensive, massive construction.

What is claimed is:

1. A die cutting machine comprising a carriage mounted for horizontal travel, companion upper and lower pressure rolls mounted in substantially fixed, vertically spaced relation on said carriage, a vertically yieldable support extending horizontally between said rolls and in supported engagement with the lower roll, a cutting die carried by said support and means for traversing said carriage horizontally in respect to said die and whereby said die carried by the vertically yieldable support will be positioned by the lower roller and material rested on the die will be subjected to the cutting effect of the die by pressure of the upper roll as the carriage carrying the rolls traverses the support carrying the die.

2. The invention according to claim 1, with means for positively driving the rolls in the horizontal travel of the carriage and the upper roll at higher surface speed than the lower roll.

3. The invention according to claim 1, in which said die support is a length of flexible sheet material supported at opposite ends and free for limited vertical movement between said supported ends.

4. The invention according to claim 1, in which the die support is inclined laterally in respect to the longitudinal axis of the machine and the carriage operates on the longitudinal axis of the machine and the rolls disposed transversely of the machine and inclined in respect to the longitudinal axis of the support.

5. The invention according to claim 4, with means for supplying material to be cut in substantial parallelism with the longitudinal axis of the support and on an incline in respect to the longitudinal axis of the machine.

6. The invention according to claim 1, in which said die support is of semi-flexible material.

7. The invention according to claim 1, in which said means for traversing the carriage includes power mechanism and two-handed switch mechanism for controlling said power mechanism, with switches spaced apart a greater distance than can be reached by the fingers of one hand and requiring conjoint action of both switches to control said power mechanism.

8. The invention according to claim 7, with a movable support for said switch mechanism shiftable to different positions for convenience of an operator observing and controlling operation of the machine.

9. The method of die cutting herein disclosed and comprising supporting a cutting die on which the material to be cut is rested, free for vertical movement between vertically spaced upper and lower rolls and traversing said rolls horizontally with the lower roll in rolling supporting relation with the die and the upper roll in rolling pressure applying engagement with material rested on the die and thereby to effect a line cut of the material between the crowns of the rolls.

References Cited in the file of this patent

UNITED STATES PATENTS

| | | |
|---|---|---|
| 420,451 | Hathaway | Feb. 4, 1890 |
| 2,088,686 | Blanchard | Aug. 3, 1937 |
| 2,127,820 | Kindelberger | Aug. 23, 1938 |
| 2,168,401 | Evers | Aug. 8, 1939 |